United States Patent [19]

Ueda et al.

[11] Patent Number: 4,682,686
[45] Date of Patent: Jul. 28, 1987

[54] ARTICULATED BELT CONVEYOR

[75] Inventors: Kouzou Ueda, Yamato; Daisuke Nagumo, Osaka; Hirotetsu Shuto, Kobe; Hiroaki Kuriyama, Takasago, all of Japan

[73] Assignee: Kyokuto Kaihatsu Kogyo Co., Ltd., Hyogo, Japan

[21] Appl. No.: 815,999

[22] Filed: Jan. 2, 1986

[30] Foreign Application Priority Data

Jan. 16, 1985 [JP] Japan .................................. 60-6144
Jun. 14, 1985 [JP] Japan .............................. 60-130390

[51] Int. Cl.[4] ............................................ B65G 15/30
[52] U.S. Cl. .................................. 198/844; 198/850; 411/546
[58] Field of Search ............... 198/844, 850, 851, 708, 198/803.2; 414/528; 403/408.1, 7; 411/546, 547, 368

[56] References Cited

U.S. PATENT DOCUMENTS

| 3,262,549 | 7/1966 | Stewart et al. | 198/850 X |
| 3,349,893 | 10/1967 | Jordan et al. | 198/850 X |
| 3,904,028 | 9/1975 | Muller | 198/844 |
| 3,977,146 | 8/1976 | Wiley | 411/546 X |

FOREIGN PATENT DOCUMENTS

| 2150777 | 4/1973 | Fed. Rep. of Germany | 198/850 |
| 2836056 | 2/1980 | Fed. Rep. of Germany | 403/408 |

Primary Examiner—Jeffrey V. Nase
Attorney, Agent, or Firm—Wenderoth, Lind and Ponack

[57] ABSTRACT

A conveying apparatus which includes a pair of sprockets provided at front and rear ends of the apparatus with a pair of endless chains passed around the sprockets on both sides of the apparatus. A plurality of support members are arranged at regular intervals with each having a box-like cross section and extending in a direction perpendicular to the feed direction for supporting objects to be carried on its upper surface. A plurality of fastening members are provided for fastening the support members to the chains and connecting members are provided for connecting the support members to the fastening members. A pair of holding portions are provided on each support member and a plurality of covering members are securely connected to the holding portions on adjacent support members for covering each gap defined therebetween.

15 Claims, 13 Drawing Figures

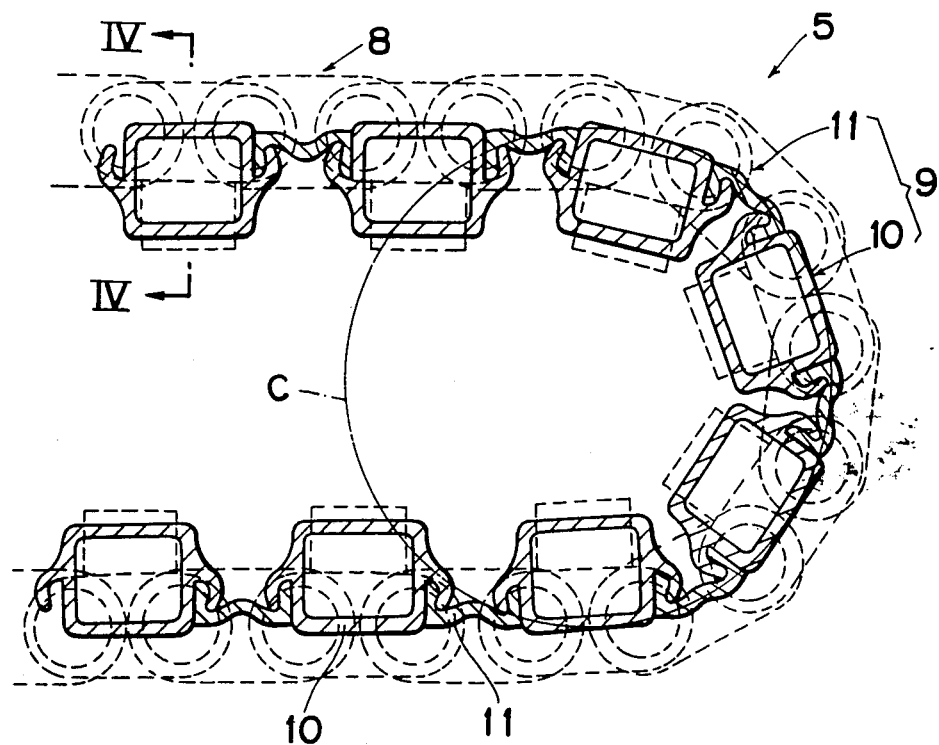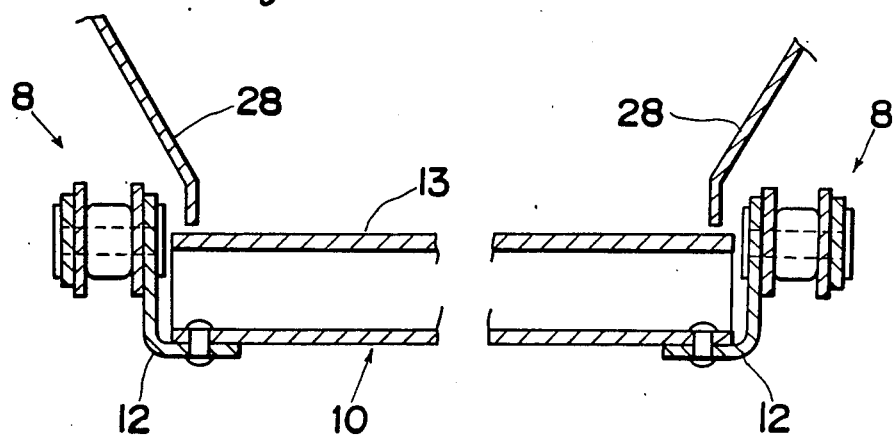

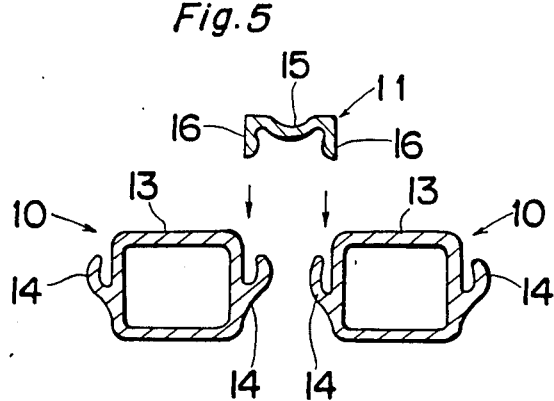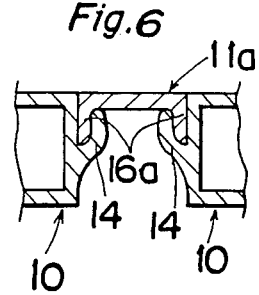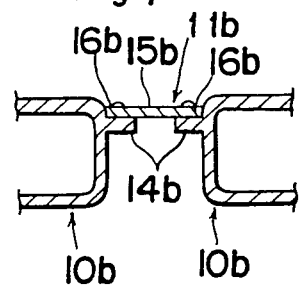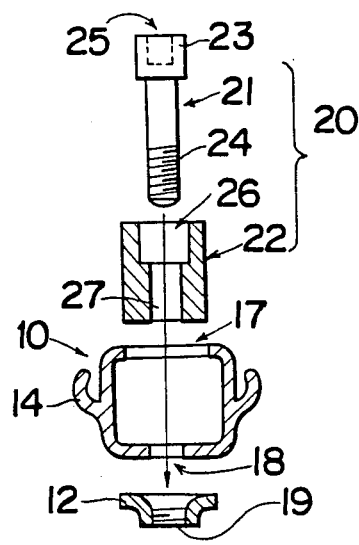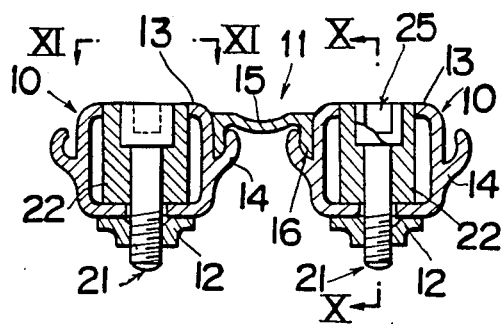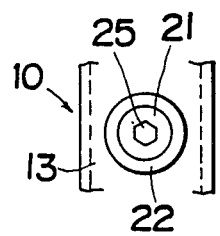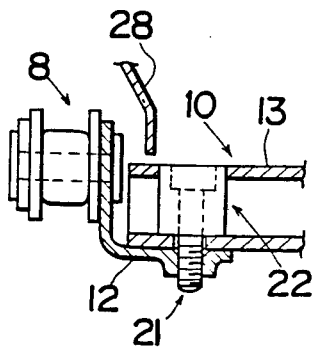

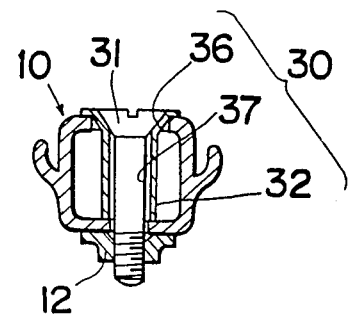
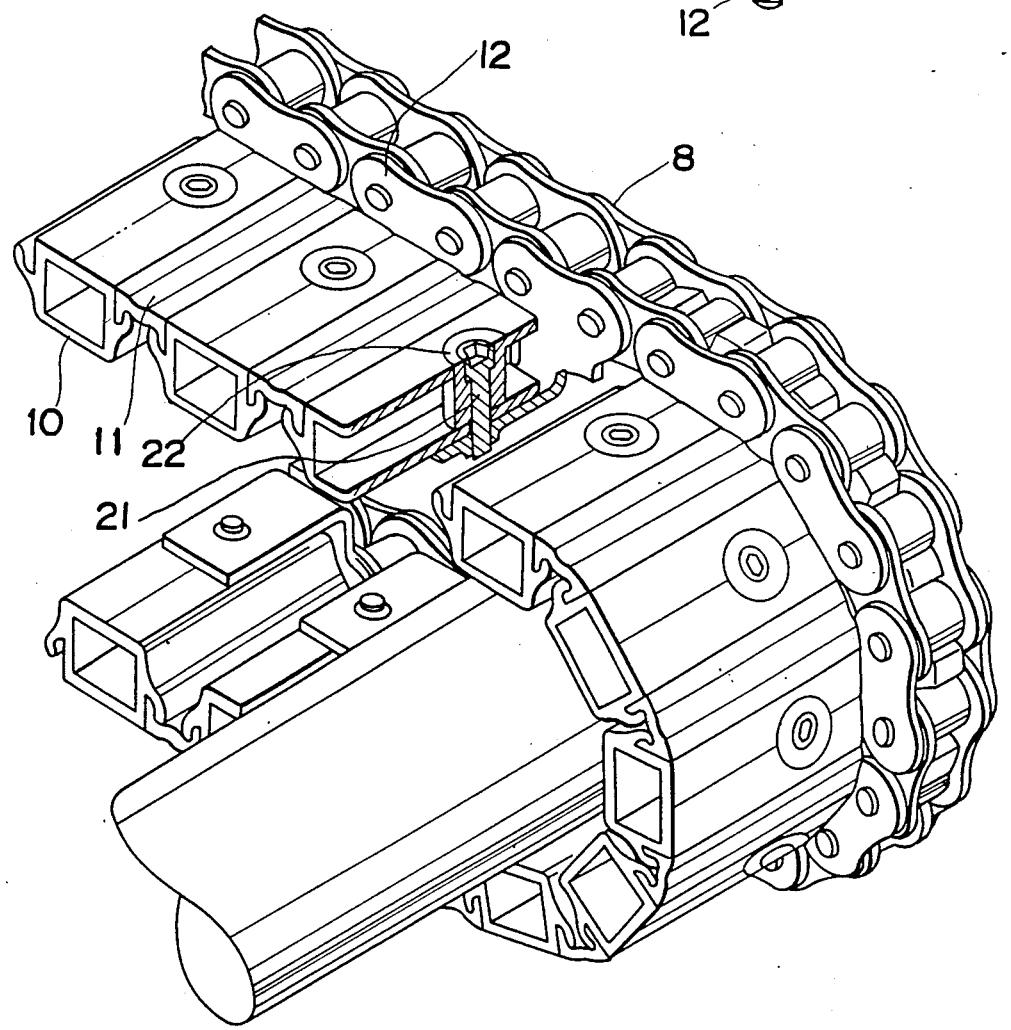

ARTICULATED BELT CONVEYOR

BACKGROUND OF THE INVENTION

The present invention generally relates to a conveyor system and more particularly, to a conveying apparatus for conveying corrugated cardboard boxes, pulverized materials or the like.

In a conventional conveying apparatus, there are provided endless chains each of which is passed around a pair of sprockets arranged at the front and rear ends on opposite sides of the conveying apparatus, a plurality of support members each having a rectangular cross section and fitted between the parallel chains on each side of the conveying apparatus, and a plurality of gaps each defined between adjacent support members for permitting smooth movement of the support members in a circular path at the front and rear ends of the conveying apparatus.

Although the above known construction is capable of conveying corrugated cardboard boxes, sacks, bags etc., when pulverized materials or the like are transported, a different type of conveying apparatus has been required which avoids spilling of the pulverized materials through the gaps between adjacent support members and consequently, there has been a drawback in that work efficiency is extremely low.

There is shown in FIG. 1 a portion of another conventional conveying apparatus wherein each support member 41 having a box-like cross section is connected to a chain 45 in a manner that the support member 41 is connectively screwed down in an L-shaped fastening member 46 extending downwardly from the chain 45 by means of a connecting member 44 through an upper side opening 42 having a large diameter and a lower side opening 43 having a small diameter, each of which is defined in the support member 41. Upon connection of the support member 41 with the L-shaped fastening member 46, the upper side opening 42 of the support member 41 is covered with a rubber cap 47 so as to prevent a portion of each object to be carried from being caught in the opening 42 or the pulverized materials from entering thereinto.

In the construction as described above, however, an extremely troublesome operation has been required for connecting the support member 41 with the chain 45, since it is necessary to fix two types of different members such as the connecting member 44 and the rubber cap 47 to the support member 41 to accomplish the above described operation.

SUMMARY OF THE INVENTION

Accordingly, an essential object of the present invention is to provide an improved conveying apparatus with improved work efficiency, which is capable of transporting not only corrugated cardboard boxes, sacks, bags, etc. but also pulverized materials or the like by arranging each of a plurality of covering members such that each one is between adjacent support members which are connected to a chain on each side of the conveying apparatus.

Another important object of the present invention is to provide a conveying apparatus of the above described type, wherein each of the covering members has a prolonged life by practically eliminating tension and compression forces acting thereon during its travel not only in a horizontal direction but also in a circular path, since the position of the covering member is substantially coincident with each of pitch circles of the sprockets.

In accomplishing these and other objects, according to one preferred embodiment of the present invention, there is provided a conveying apparatus which includes a pair of sprockets at its front and rear ends, a pair of chains passed around the sprockets on both sides of the apparatus, a plurality of support members arranged at regular intervals, each having a box-like cross section and extending in a transverse direction, that is, in a direction perpendicular to a direction in which the support members travel for supporting objects to be carried on their upper surfaces, a plurality of L-shaped fastening members for connecting the support members to the chains and a plurality of covering members each of which is securely connected between adjacent support members at its front and rear ends for covering each gap defined therebetween.

BRIEF DESCRIPTION OF THE DRAWINGS

These and other objects and features of the present invention will become apparent from the following description taken in conjunction with the preferred embodiments thereof with reference to the accompanying drawings, in which:

FIG. 3 is a longitudinal sectional view, on an enlarged scale, of a main portion of the conveying apparatus;

FIG. 4 is a cross sectional view taken along the line IV—IV in FIG. 3;

FIG. 5 is an exploded sectional view of the main portion of the conveying apparatus;

FIG. 6 is a sectional view of the covering member of the conveying apparatus which particularly shows a modification thereof;

FIG. 7 is a sectional view of the covering member of the conveying apparatus which shows another modification thereof;

FIG. 8 is a sectional view, on an enlarged scale, of the main portion of the conveying apparatus;

FIG. 9 is an exploded sectional view of a portion of FIG. 8;

FIG. 10 is a sectional view taken along the line X—X in FIG. 8;

FIG. 11 is a top plan view as observed in the direction of arrows XI—XI in FIG. 8;

FIG. 12 is a fragmentary perspective view of the main portion of the conveying apparatus; and FIG. 13 is a sectional view, on an enlarged scale, similar to FIG. 9 which particularly shows a modification thereof.

DETAILED DESCRIPTION OF THE INVENTION

Figure 1:
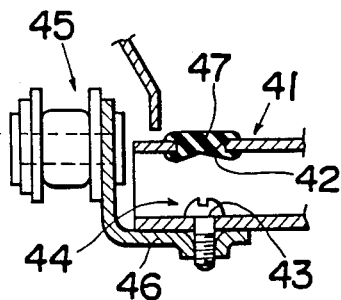
FIG. 1 is a sectional view of a connecting portion of a support member and a chain of a conventional conveying apparatus (already referred to)

Before the description of the present invention proceeds, it is to be noted that like parts are designated by like reference numerals throughout the accompanying drawings.

Figure 2:
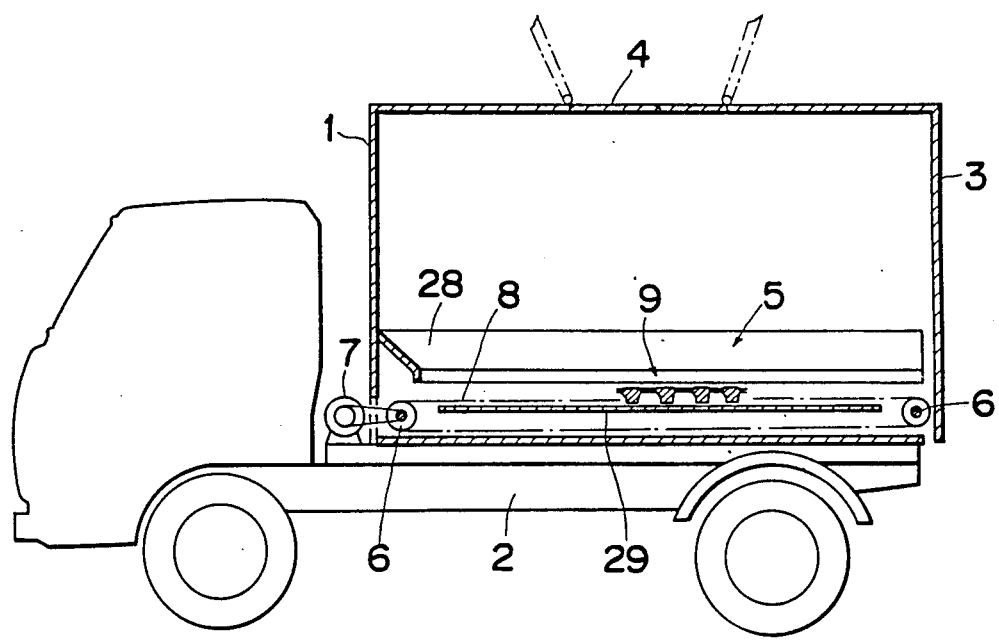
FIG. 2 is a schematic diagram of a conveying apparatus according to one preferred embodiment of the present invention which is installed in an automotive vehicle.

Referring now to the drawings, there is shown in FIG. 2 a conveying apparatus 5 according to one preferred embodiment of the present invention which is installed in an automotive vehicle, such as a truck. The truck is provided with a box-like body 1 arranged on a vehicle body 2, a door 3 at the rear end of the body 1, a top cover 4 at the upper portion thereof, the conveying apparatus 5 disposed at the lower portion thereof and directly related to the present invention, guide plates 28 disposed on inner walls of the body 1 and a supporting member 29 for supporting a conveyor body 9.

The conveying apparatus 5 according to the present invention comprises a pair of sprockets 6 at its front and rear ends, a driving motor 7 connected to the front end sprocket 6, a pair of endless chains 8 passed around the sprockets 6 on each side of the conveying apparatus 5, the conveyor body 9 having a plurality of support members 10 and a plurality of covering members 11 for covering gaps between adjacent support members 10 and forming a continuous surface with the upper support surfaces of the support members, with the chains 8 being attached to the conveyor body 9 so as to move it to and fro while being driven by the driving motor 7.

Referring also to FIGS. 3, 4 and 5, each of the support members 10 has a rectangular cross section and extends in a transverse direction, that is, in a direction perpendicular or normal to the direction in which the support members 10 travel. Each support member is securely fixed at either end of a lower portion thereof to an L-shaped fastening member 12 which extends downwardly from each chain 8 whereby various objects can be carried on the flat upper support surfaces 13 of the support members 10. Each of the support members 10 is further provided with a pair of holding portions 14 disposed on front and rear faces depending from the support surface thereof, with one end of each of the holding portions 14 extending in a direction substantially perpendicular to the support surface and spaced from the support member 10 with which it is associated. In addition, the holding portion 14 is formed such that the distance between the one end of the holding portion 14 and a respective front or rear face of the support member 10 decreases towards the support surface of the support member. Each of the covering members 11 extends in a transverse direction and has approximately the same length as that of the support member 10. Each of the covering members 11 is generally formed in a shape similar to that of a figure "U" in cross section and is provided with a flexible central portion 15 at its corner, which is slightly bent, and hard connecting leg portions 16 at its front and rear ends for engagement in the spaces between the holding portions 14 and the support members 10, with each of the connection portions 16 having a lower portion slightly thicker than an upper portion thereof. The covering member 11 is engaged with the support member 10 in a manner such that the connecting portion 16 of the covering member 11 is inserted downwards into the space between the holding portion 14 and the support member 10 to form a tight fit therebetween and the covering member 11 can be disengaged from the support member 10 by being lifted upwardly therefrom. This remarkably facilitates insertion and removal of the covering members 11. Furthermore, it is designed such that when the connecting portions 16 of the covering member 11 are engaged with the holding portions 14 of the support members 10, the position of each covering member 11 is substantially coincident with a pitch circle C of each of the sprockets 6 so as to reduce a change in the amount of deflection of the flexible portion 15 of the covering member 11.

There is shown in FIG. 6 a modified covering member 11a having a flexible flat upper surface which is approximately on the same level as that of the support member 10 in a case in which each of the connecting portions 16a of the covering member 11a is engaged with each of the holding portions 14 of adjacent support members 10. This results in a stable support for carrying objects and allows easy cleaning of the conveyor body 9.

FIG. 7 further illustrates another modified covering member 11b in the form of a flat plate with a central flexible portion 15b, whereby the covering member 11b is capable of expanding and contracting to some extent and hard connecting portions 16b at its opposite ends whereby the covering member 11b is connectively bolted to modified connecting portions 14b of adjacent support members 10b.

Furthermore, in each of the above described modifications, it is designed such that a change in the amount of expansion and contraction of the covering member can be reduced due to substantial coincidence between the position of the covering member 11a or 11b and each of the pitch circles C of the sprockets 6, as in the foregoing embodiment.

It is to be noted here that in the foregoing embodiment, although the covering member 15 has the flexible portion 15 at its central portion and the hard connecting portions 16 at its front and rear sides, the construction may be so modified that the whole covering member 11, 11a or 11b has flexibility and is fixedly bolted at its opposite ends onto the support members 10 by means of holding plates.

Referring next to FIGS. 8 through 12, there is shown a manner in which each of the support members 10 is connected with each of the chains 8. The support member 10 is provided, on its opposite ends, with an upper opening 17 having a large diameter formed on its upper surface and another axially aligned lower opening 18 having a smaller diameter is formed on its lower surface, and furthermore, the L-shaped fastening member 12 is provided with a threaded opening 19 at a position immediately under the lower opening 18 of the support member 10. Connecting means comprising members 20 for connecting the support member 10 with the chain 8 are composed of a fastening bolt 21 and a spacer 22, both of which are generally commercially available. The fastening bolt 21 is provided with a head portion 23 having a large diameter and a threaded portion 24 having a smaller diameter. The fastening bolt 21 is screwed into the threaded opening 19 of the fastening member 12 by being rotated with a hexagonal wrench which is inserted into a hexagonal opening 25 defined at the central portion on the upper surface of the head portion 23 of the fastening bolt 21. The spacer 22 has an outer diameter approximately the same as the inside diameter of the upper opening 17 of the support member 10, an opening 26 which has a large inner diameter approximately the same as the outer diameter of the head portion 23 of the fastening bolt 21 and another opening 27 which has a small inner diameter approximately the same as the outer diameter of the threaded portion 24 of the fastening bolt 21. When the fastening bolt 21 is screwed into the fastening member 12 through both of the openings 26 and 27 of the spacer 22 for securely connecting the support member 10 with the chain 8, the spacer 22 comes in contact with the inner surface of the support member 10 at its lower surface for securing the spacer 22 in the support member 10 and the upper surface of the spacer 22 is on the same level with that of the upper surface of the support member 10 so as to close the upper opening 17 of the support member 10 with the spacer 22.

FIG. 13 illustrates another example of the connecting members 30 comprising a countersunk bolt 31 which is generally commercially available for being employed as the fastening bolt 31, and a spacer 32 provided with a tapered opening 36 and an opening 37 having a small diameter so as to fit closely around the countersunk bolt 31, with the upper opening 17 of the support member 10 being closed with the countersunk bolt 31 and the spacer 32.

It is to be noted here that in the foregoing embodiments, although the fastening member 12 is provided with the threaded opening, it may be modified such that the fastening bolt is screwed into a nut disposed under the fastening member 12 so as to connect the support member 10 with the fastening member 12 by fastening the nut to the bolt. When the support member 10 is replaced, such as when it has become deformed, since the support member 10 can be removed from the chain 8 by unfastening the fastening bolt 21 from the fastening member 12, a simplified exchanging operation for the support member 10 can be achieved.

Subsequently, functioning of the conveying apparatus having the construction as described so far will be explained hereinafter.

In the first place, in case of transportation of corrugated cardboard boxes, the door 3 at the rear end of the body 1 is opened for placing the objects to be carried on the conveyor body 9 and thereafter, the objects are transferred frontwards with frontward movement of the conveyor body 9 driven by the driving motor 7, while the objects are simultaneously set in place and finally the door 3 is closed prior to the transportation of the objects to a destination. Upon arrival of the objects to the destination, the door 3 is initially opened and the objects can be unloaded one after another by moving the conveyor body 9 backwardly. At his movement, since each of the support members 10 has a flat surface 13, the objects can be supported thereon in a stable state.

Alternatively, when pulverized materials or the like are transported, the top cover 4 is initially opened for loading the pulverized materials therethrough onto the conveyor body 9 and when the body 1 has become full of the pulverized materials, the top cover 4 is closed prior to the transportation of the pulverized materials to a destination. Upon arrival of the pulverized materials to the destination, the pulverized materials can be unloaded in the same manner as the unloading manner of the corrugated cardboard boxes as described above. In this case, since the covering member 11 is arranged between adjacent support members 10 of the conveyor body 9, the pulverized materials or the like are prevented from dropping undesirably through the support gap between adjacent members 10 and in addition, even in case that the conveyor body 9 travels in a circular path at its front and rear ends, since each of the covering members 11 has the flexible portion 15, the conveyor body 9 can smoothly travel at both ends thereof.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A conveying apparatus which comprises:
   a pair of sprockets provided at front and rear ends thereof;
   a pair of endless chains passed around said sprockets at opposite sides thereof;
   a plurality of support members arranged at regular intervals, each having a box-like cross section and extending in a direction perpendicular to the direction in which said support members travel for supporting objects to be carried on its upper support surface;
   a plurality of fastening members for fastening said support members to said chains;
   a connecting means for connecting said support members to said fastening members;
   a pair of holding portions disposed on front and rear faces of each of said support members; and
   a plurality of covering members each securely connected between adjacent support members and forming a continuous surface with the upper support surface of each of said adjacent support members, each covering member being connected at front and rear ends thereof to said holding portions of adjacent support members for covering each gap defined therebetween.

2. A conveying apparatus as claimed in claim 1, wherein said connecting means comprises a spacer for closing an upper side opening defined on each end of each said support member and a fastening bolt for connectively bolting said support member to said fastening member through said spacer and a lower side opening defined on each end of each said support member, with said upper side opening having a large inner diameter and said lower side opening having a small inner diameter.

3. A conveying apparatus as claimed in claim 1, wherein said covering member has a central flexible portion which is bent to a certain extent.

4. A conveying apparatus as claimed in claim 1, wherein said covering member has a flexible flat upper surface which is approximately on a level with that of said support member.

5. A conveying apparatus as claimed in claim 1, wherein said covering member is in the form of a flat plate, and has a central flexible portion whereby said covering member is capable of expanding and contracting to a certain extent.

6. A conveying apparatus as claimed in claim 1, wherein the position of each said covering member is substantially coincident with each of pitch circles of the sprockets.

7. A conveying apparatus which comprises:
   a pair of sprockets on one side of said conveying apparatus and a pair of sprockets on the other side of said conveying apparatus;
   a pair of chains, each of which is supported on a respective one said pair of sprockets;
   a plurality of fastening members supported on said pair of chains at regular spaced intervals;
   a plurality of support members having a box-like cross section taken in a vertical plane parallel to a feed direction of said conveying apparatus, each of said support members extending in a direction perpendicular to said feed direction and having a support surface for supporting objects to be carried by said conveying apparatus;

connection means associated with each of said support members for connecting said support members to respective fastening members;

a pair of holding portions disposed on opposite faces depending from the support surface of each of said support members, said holding members each having one end thereof extending in a direction substantially perpendicular to a respective support surface and being spaced from a respective one of said opposite faces by a distance which decreases towards said respective support surface; and a plurality of covering members, each of which extends between adjacent support members, each of said covering members having leg portions on either side of a central portion with each of said leg portions having a shape which is tightly fitted between a respective one of said holding portions and a corresponding one of said faces of said support members.

8. A conveying apparatus as claimed in claim 7, wherein said central portion of each of said covering members is flexible and has a slight bend extending between said leg portions.

9. A conveying apparatus as claimed in claim 7, wherein said central portion of each of said covering members is flexible and extends between adjacent support members with an upper surface thereof on approximately the same level as each support surface of the adjacent support members.

10. A conveying apparatus as claimed in claim 7, wherein said covering members are disposed such that each central portion thereof follows a path which is coincident with pitch circles of said sprockets.

11. A conveying apparatus as claimed in claim 7, wherein each of said support members includes axially aligned openings through said support surface and an opposite lower surface, said openings being provided at opposite ends of each support member, said openings in said support surface being larger than said openings in said lower surface, and said connection means comprising spacers each of which is fitted through and fills a respective one of said openings in said support surface and bolts, each of which is fitted through an opening in a respective one of said spacers, each of said bolts extending through a respective one of said openings in said lower surface of one of said support members.

12. A conveying apparatus which comprises:
a pair of sprockets on one side of said conveying apparatus and a pair of sprockets on the other side of said conveying apparatus;
a pair of chains, each of which is supported on a respective one said pair of sprockets;
a plurality of fastening members supported on said pair of chains at regular spaced intervals;
a plurality of support members having a box-like cross section taken in a vertical plane parallel to a feed direction of said conveying apparatus, each of said support members extending in a direction perpendicular to said feed objects to be carried by said conveying apparatus;
connection means associated with each of said support members for connecting said support members to respective fastening members;
a pair of holding portions disposed on opposite faces depending from the support surface of each of said support members;
a plurality of covering members, each of which extends between holding portions, extending from adjacent support members; and
bolt means associated with each of said covering members for connecting said covering members to said holding portions.

13. A conveying apparatus as claimed in claim 12, wherein each of said covering members has a flat plate shape with a flexible central portion.

14. A conveying apparatus as claimed in claim 13, wherein said central portion of each of said covering members is disposed to follow a path which is coincident with pitch circles of said sprockets.

15. A conveying apparatus as claimed in claim 12, wherein each of said support members includes axially aligned openings through said support surface and an opposite lower surface, said openings being provided at opposite ends of each support member, said openings in said support surface being larger than said openings in said lower surface, and said connection menas comprising spacers, each of which is fitted through and fills a respective one of said openings in said support surface and bolts, each of which is fitted through an opening in a respective one of said spacers, each of said bolts extending through a respective one of said openings in said lower surface of one of said support members.

* * * * *